United States Patent [19]

Gervais et al.

[11] 4,226,519
[45] Oct. 7, 1980

[54] SELF-DEVELOPING FILM PACK WITH IMPROVED SPREAD CONTROL STRUCTURE

[75] Inventors: Theodore Gervais, Burlington; Thomas P. McCole, South Natick, both of Mass.

[73] Assignee: Polaroid Corporation, Cambridge, Mass.

[21] Appl. No.: 26,200

[22] Filed: Apr. 2, 1979

[51] Int. Cl.³ .................. G03B 19/10; G03B 17/50; G03B 17/02; G03C 1/48

[52] U.S. Cl. .................................. 354/174; 354/86; 354/276; 354/304; 430/499

[58] Field of Search ............... 96/63, 76 C; 354/304, 354/83, 85, 86, 275, 276, 174

[56] References Cited

U.S. PATENT DOCUMENTS

| | | | |
|---|---|---|---|
| Re. 29,756 | 9/1978 | Gold | 354/85 |
| 3,714,879 | 2/1973 | Land et al. | 354/83 |
| 3,750,551 | 8/1973 | Land et al. | 354/83 |
| 3,779,770 | 12/1973 | Alston et al. | 96/76 C |
| 3,832,731 | 8/1974 | Kinsman | 96/76 C X |
| 3,948,662 | 4/1976 | Alston et al. | 96/63 |
| 3,979,762 | 9/1976 | Hendry et al. | 354/86 X |
| 4,005,446 | 1/1977 | Friedman | 354/304 X |
| 4,016,582 | 4/1977 | Wareham | 354/83 X |
| 4,052,728 | 10/1977 | Hendry et al. | 354/86 |
| 4,134,655 | 1/1979 | Friedman | 354/86 |

*Primary Examiner*—Donald A. Griffin
*Attorney, Agent, or Firm*—John S. Vale

[57] ABSTRACT

A film pack, for use in a self-developing camera, including a film container having improved processing fluid spread control structure embodied in an extended forward wall portion of the container adjacent a film withdrawal slot to locate a spread control surface thereon in closer relation to a pair of pressure rollers in the camera. Although the forward wall is extended, the longitudinal dimension of the container, near its rear wall, has been maintained so that the improved pack will fit existing cameras. Also, the leading end wall of the container has been angled or sloped to improve the upward feed of film units toward an exposure position in the container. An alternative embodiment is disclosed.

6 Claims, 11 Drawing Figures

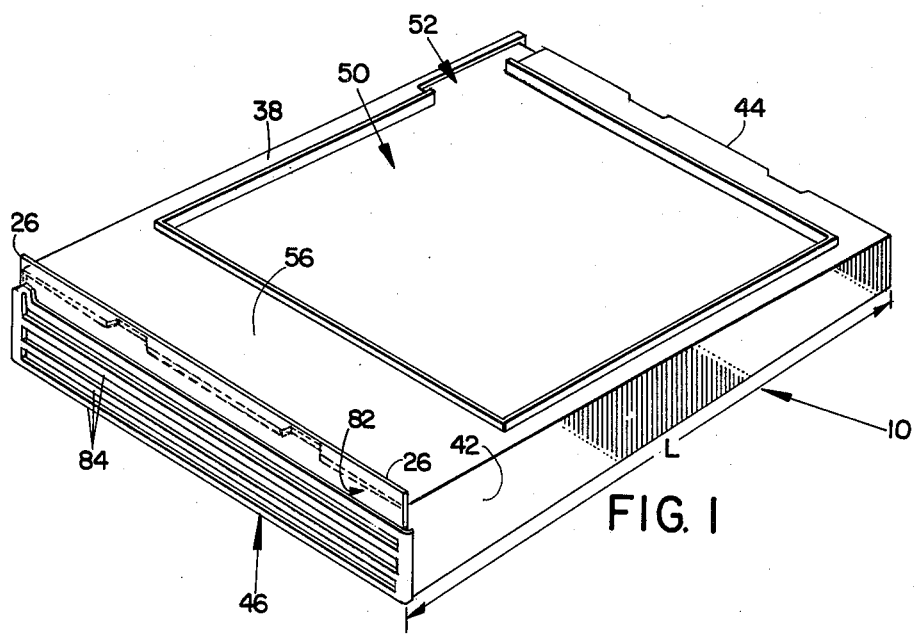
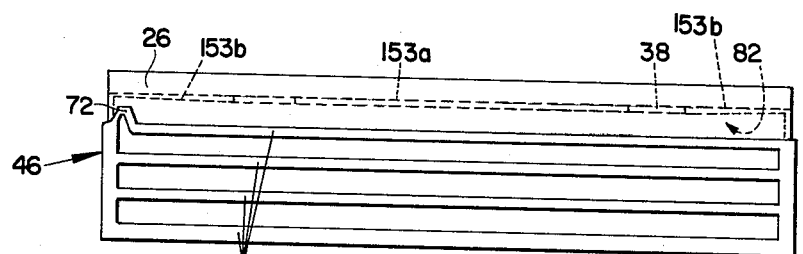
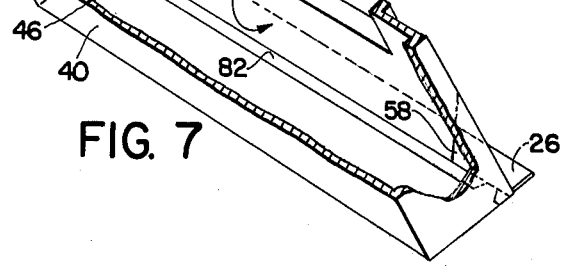
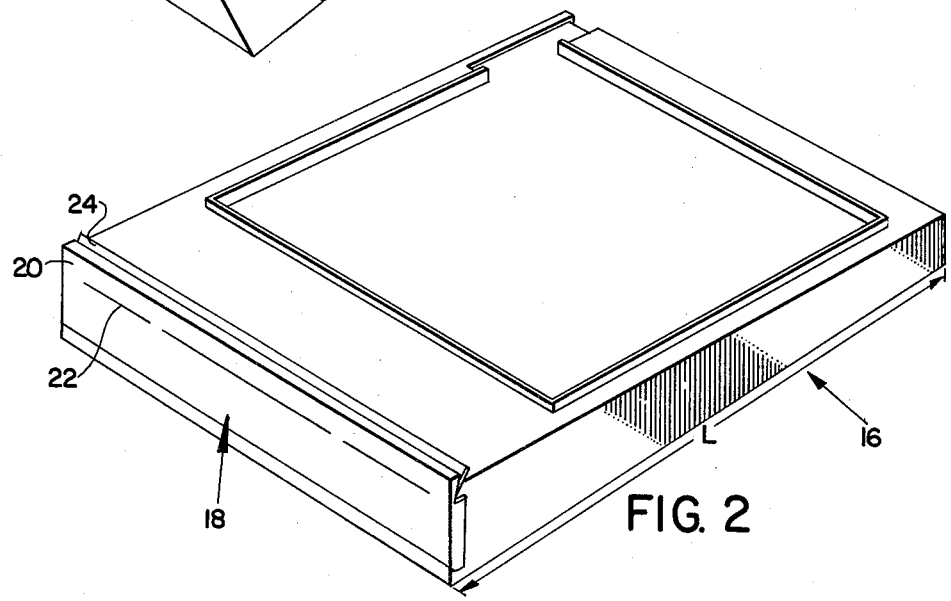

SELF-DEVELOPING FILM PACK WITH IMPROVED SPREAD CONTROL STRUCTURE

BACKGROUND OF THE INVENTION

1. Field of the Invention

The present invention relates to the field of photography and, more specifically, to improved photographic film packs for use in self-developing cameras and other related photographic apparatus.

2. Description of the Prior Art

The present invention is directed to certain improvements in photographic film assemblages or packs configured for use with compact, highly-automated self-developing cameras. These film packs include a film container or cassette having an exposure aperture in a forward wall or face and a film withdrawal slot at one end of the container adjacent the forward wall; at least one but preferably a plurality of "integral type" self-developing film units arranged in stacked relation behind the forward wall and biasing means, such as a spring platen, for urging the stack of film units toward the forward wall to locate the top film unit against the underside of the forward wall in a forwardmost exposure position. Subsequent to exposure, the forwardmost film unit is advanced through the withdrawal slot and into the bite of a pair of camera mounted pressure-applying rollers which apply a compressive pressure to the film unit as it is advanced therebetween to discharge a supply of fluid processing composition, from a pod at the leading end of the film unit, and distribute the fluid imagewise between a predetermined pair of layers in the film unit to cover the film unit's image forming area and initiate a well-known development and diffusion transfer process.

The "integral type" film unit is configured as a multilayer laminate and includes a transparent window through which the photosensitive material is exposed. After processing, the same window is used to view a positive image print. By the use of this construction, the need to peel apart separate negative and positive sheet elements after fluid distribution is eliminated.

Because the laminate sheet elements or layers are tightly bound together at their lateral edges, the predetermined pair of layers tend to separate more in the center of the film unit than out at the lateral margin in response to the fluid being distributed therebetween. In other words, there is more resistance to fluid flow at the edges of the film unit than in its center section. Upon initial discharge of the fluid from the pod, it assumes a rearwardly extending tongue shape rather than proceeding toward the trailing end of the film unit along a uniform wave front. Without additional spread control, an overabundance of fluid in the center portion of the film unit may lead to insufficient fluid to completely cover the trailing end corners of the film unit's image forming area. It is well known in the art of instant photography to apply a second compressive pressure to the film unit, behind the pressure-applying rollers, to a selected portion or center section of the film unit for the purpose of modifying the wave front so that it progresses in a more uniform manner toward the trailing end. This pressure selectively limits the gap between the predetermined layers at their center thereby retarding the center of the tongue shaped wave front and allowing the fluid to be diverted outwardly to the lateral margin areas where there is less resistance to fluid flow because of the absence of the second compressive force in those areas.

In the earlier years of self-developing photography, pressure was applied with a pressure plate located between the rollers and the film exit slot of the film container. In more recent times, the spread control structure for applying the second compressive force to the center of the film unit has been built directly into the film container and generally includes pressure applying structure located on the underside of the forward wall near the film withdrawal slot.

One example of such a contemporary self-developing film pack is the commercially available SX-70 Land Film, manufactured by Polaroid Corporation, Cambridge, Mass.

For an example of the spread control structure used therein, reference may be had to commonly assigned U.S. Pat. Nos. 3,779,770 and 3,948,662.

Briefly the underside of the forward wall near the film withdrawal slot has integrally molded triangular sections which thin down the forward wall near the lateral edges of the withdrawal slot. This structure is best shown in FIGS. 9, 9a and 9b of the two previously noted patents.

When the forwardmost film unit in the stack is urged against the underside of the forward wall by the spring platen, the relatively thick center section of the forward wall near the withdrawal slot presses on the center of the film unit advancing therethrough and into the bite of the pressure rollers while the thinner lateral portions of the forward wall defined by the triangular sections is subjected to a relatively small compressive force. In this manner, the second compressive force is applied selectively to the center and serves to modify the shape of the fluid wave front as previously described.

Another characteristic feature of the commercially available SX-70 Land Film pack is that it includes a molded plastic end cap over the film withdrawal slot which is moved from a slot blocking position to an unblocking position by structure in the self-developing camera in response to inserting the film pack into the camera's receiving chamber. Such an end cap is described and claimed in commonly assigned U.S. Pat. No. Re 29,756, reissued on Sept. 5, 1978. While the end cap does not play any part in controlling the distribution of the processing fluid, the reference is provided to more accurately describe the prior art film pack. Also, it will be found hereinafter that one of the improvements of this invention is to provide a film pack that does not require such an end cap.

The SX-70 Land Film pack is intended for use in a variety of self-developing cameras manufactured by the Polaroid Corporation, Cambridge, Mass. These include the SX-70, Pronto!, and OneStep Land cameras. For representative examples of these cameras, reference may be had to commonly assigned U.S. Pat. Nos. 3,714,879; 3,750,551; 3,979,762; 4,052,728; and 4,134,655.

Each of these cameras has a front pack loading door, mounting a pair of pressure-applying rollers, that is movable from an operative closed position to an open position that provides access to the open end of a film pack receiving chamber. Structure is provided in the receiving chamber for accurately locating the pack or film container at an operative position within the camera. Longitudinally, pack placement is defined by a fixed rear stop in the camera and a leading end stop mounted on the movable loading door section.

Because the distance between the stops is fixed, there is a limit as to just how much an improved film pack may be modified. In other words, dimensional considerations of the camera must be considered so that any modification of the pack or film container will be compatible with existing cameras in the hands of consumers.

While the spread control system of the commercially available pack works very well, it has been found that on a statistical basis there is some room for improvement. More specifically, while there are very few instances in which the trailing end corners of the image area are not covered, analysis of the distribution of the fluid under the lateral margin binder and in the trap area at the end of the film unit indicates that the efficiency of fluid distribution could be improved to the point where it may be possible to provide a smaller volume of fluid with each film unit thereby leading to a significant cost reduction. Also, statistically there are a small number of feed failures. That is, there are instances where the spring platen has failed to advance a film unit to the forwardmost exposure position indicating that the leading and trailing edges of a film unit may be in binding relation with the interior surfaces of the leading and trailing end walls of the container.

Therefore, it is an object of the present invention to improve the spread control structure thereon while at the same time maintaining certain common dimensional characteristics of the film container so that it is compatible with existing cameras.

Also, it is another object of the invention to improve the structure of the film container to facilitate the upward feeding of a stack of film units to the forwardmost position by a spring platen located in the film container.

Other objects of the invention will, in part, be obvious and will, in part, appear hereinafter.

SUMMARY OF THE INVENTION

The present invention provides an improved photographic film pack of the type described, for use in a self-developing camera, which has certain modifications relating to the extending or lengthening of the forward wall to move at least a portion of a fluid spread control surface closer to the pressure-applying rollers of a camera when a film pack is located at its operative position within the camera's receiving chamber and yet maintaining the overall length of the film pack adjacent a rear wall so that the pack will fit into existing cameras. Also, within these constraints of pack compatibility, the leading end wall having the film withdrawal slot therein has been angled slightly to provide more clearance between the leading and trailing end wall inner surfaces to facilitate film feed toward the forwardmost position.

The spread control surface extensions are defined in terms of stop limits within the camera receiving section or, alternatively, in terms of a fixed longitudinal length of the pack compatible with the fixed stops to show that the extended spread control structure extends beyond an imaginary plane coincidental with the fixed length or the camera stops so as to extend into a zone Z between the camera stop closest to the pressure-applying rollers and the bite line of the rollers.

While the physical dimension of the extension will seem small, in fact, significant improvements in spread control and efficiency have been observed with this change of structure. As will be noted later herein, the degree with which the spread control surface can be moved closer to the bite line of the rollers is somewhat limited, at the present time, because any modification of the film pack must be compatible with manufacturing tolerances and tolerance stackup when the film pack is located in the receiving chamber of a camera.

A first embodiment is shown wherein the spread control surface is extended over the leading end wall further in the center than out at its lateral margins. This configuration provides an interference fit of the center section with the top edge of the leading end wall over the withdrawal slot to prevent or limit excessive deflection of the thin forward wall which may cause premature discharge of fluid from one of the pods of a film unit in the container while the user is handling the container during its insertion into the camera. This particular first embodiment has been configured to be compatible with existing automatic machinery for locating the contents of the film container therein. In a second embodiment, the spread control surface has been extended even further over the leading end wall and the withdrawal slot and has been designed to be used with other types of automatic machinery that do not impose the constraints that are applicable to the film container of the first embodiment.

BRIEF DESCRIPTION OF THE DRAWINGS

For a fuller understanding of the nature and objects of the invention, reference should be had to the following detailed description taken in connection with the accompanying drawings wherein:

FIG. 1 is a perspective view of a first embodiment of an improved photographic film assemblage or pack embodying the present invention;

FIG. 2 is a perspective view of a photographic film pack that is a representative example of the prior art shown for comparison purposes to more clearly and distinctly point out the improvements which constitute the subject matter of this invention;

FIG. 6 is a front elevational view of the improved photographic film pack of FIG. 1;

FIG. 7 is a perspective view of a forward portion of the film container showing the placement of spread control structure on the underside of the container's forward wall adjacent a film withdrawal slot;

DESCRIPTION OF THE PREFERRED EMBODIMENT

Figure 3:
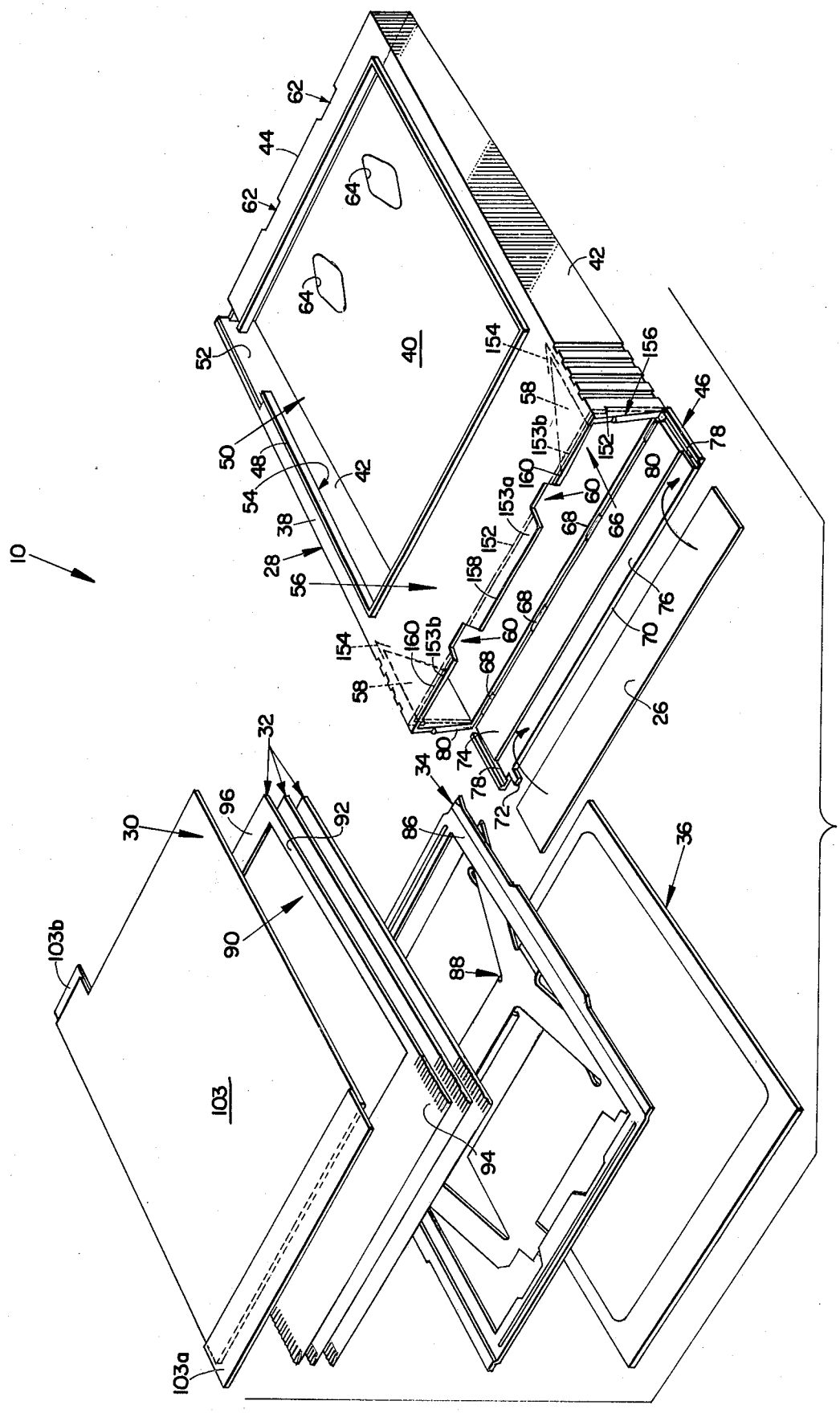
FIG. 3 is a perspective view of a film container and its contents, shown in exploded fashion, comprising the improved photographic film pack of FIG. 1.
Figure 4:
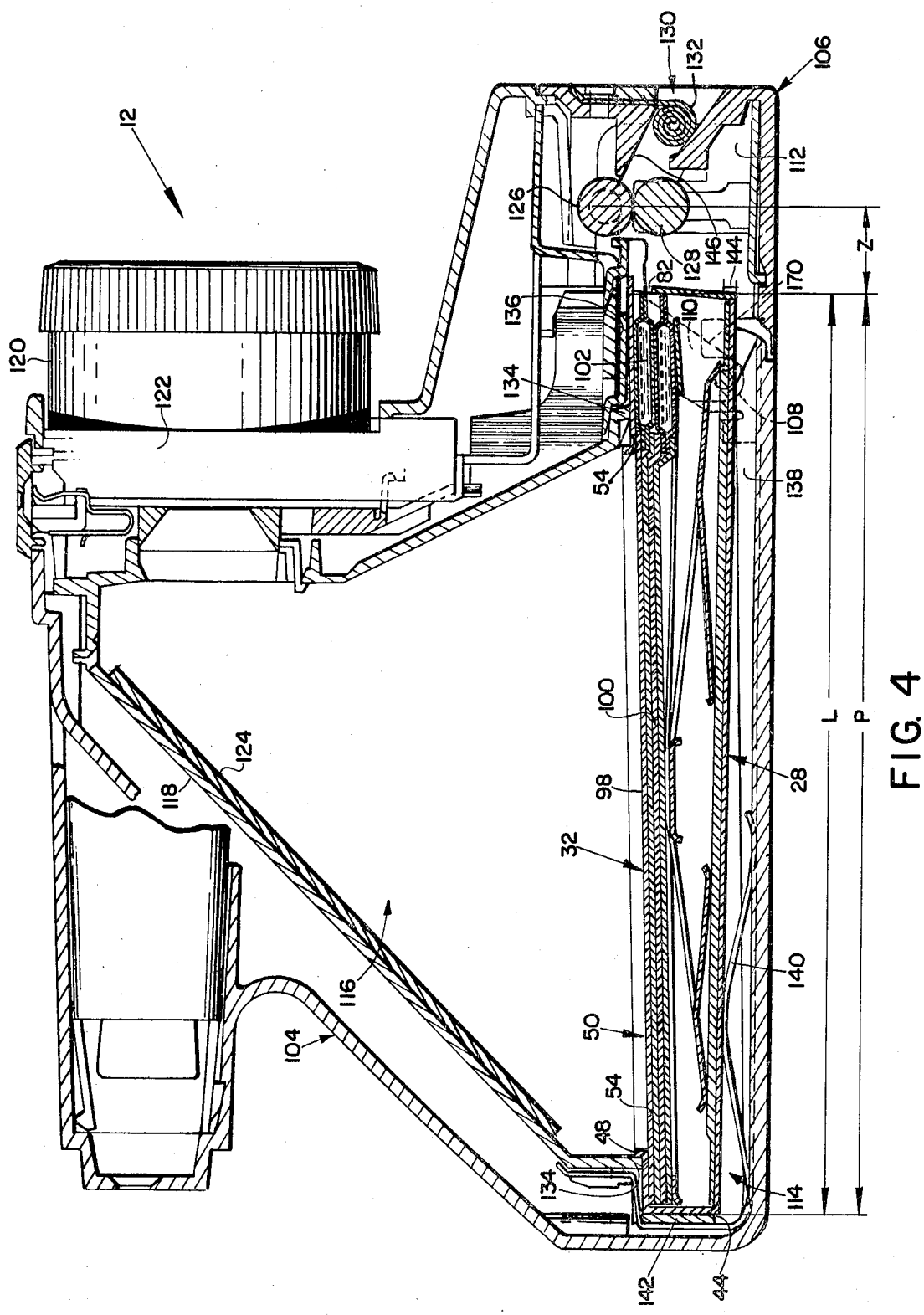
FIG. 4 is a side elevational view, partly in center line section, showing a self-developing camera and the improved film pack located at an operative position within the camera's receiving chamber.

FIGS. 1, 3, 4, 5 and 6 of the drawings show a first embodiment of an improved photographic film pack 10 embodying the present invention and being configured for use in a compact, highly-automated, self-developing camera 12 of the general type shown in FIG. 4.

Figure 8:
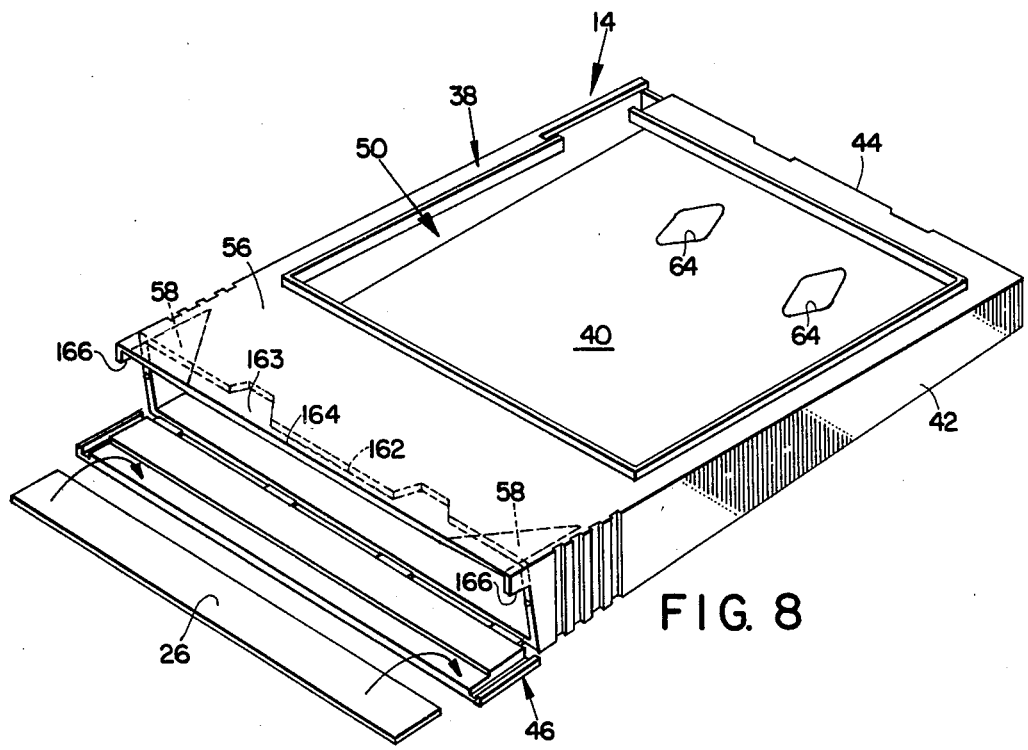
FIG. 8 is a perspective view of a second embodiment of the present invention showing the film container prior to the insertion of its contents with its leading end wall in an open position and a flexible light seal detached therefrom.
Figure 9:
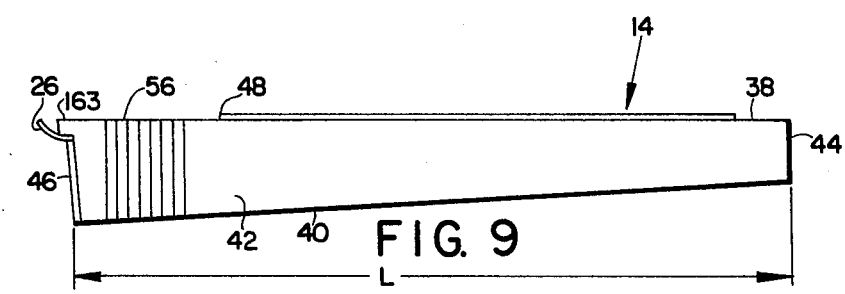
FIG. 9 is a side elevational view of the film pack of FIG. 8 with the leading end wall and light seal in the operative closed position.

A later-to-be-described alternative embodiment of the improved film pack is shown in FIGS. 8 and 9 and carries the numerical designation pack 14.

For comparative purposes, and to more clearly and specifically point out the improvements and structural differences that are the subject matter of the present invention, a perspective view of a commercially available film pack 16, manufactured by Polaroid Corporation, Cambridge, Mass., under the designation SX-70 Land Film, is shown in FIG. 2 of the drawings as a representative example of the prior art.

Upon comparing packs 10 and 14 with pack 16, it is immediately apparent that one difference relates to the film withdrawal slot light sealing structure at the leading end of the film container.

The prior art pack 16 includes a substantially rigid molded plastic end cap assembly 18 having a displaceable upper film withdrawal slot covering end cap 20 that serves as a withdrawal slot light seal prior to inserting pack 16 into camera 12. As pack 16 is inserted into the camera's receiving chamber, structure thereon engages the lateral side portions of end cap 20 and pivots it downwardly about hinge line 20 to uncover a light opaque, resiliently displaceable plastic sheet light seal 24 that serves as an in-camera or secondary light seal for the film withdrawal slot.

From FIGS. 1, 3, 5, 6, 8 and 9 it will be apparent that improved film packs 10 and 14 do not include such an end cap 20 but they do have a light opaque, resiliently displaceable light seal 26 covering the later-to-be-described film withdrawal slot.

The more important differences between the improved film packs 10 and 14 and the illustrated prior art pack 16 relate to improvements in spread control structure on the film container near the film withdrawal slot for improving the efficiency of the distribution of a fluid processing composition between predetermined layers of the film unit during film processing. Other improvements relate to restructuring the disposition of the leading end wall of the film container to improve upward film feed towards a forwardmost exposure position. These structural and functional improvements will be set forth in detail herein after packs 10 and 14 and camera 12 have been described in enough detail to set forth the environment in which these improvements operate.

With reference to FIG. 3, the photographic film assemblage or pack 10 (also alternative embodiment pack 14) comprises a film container 28; certain members attached thereto including the light seal 26; and the contents of the film container 28 including a dark slide 30; a stack of individual self-developing film units 32; means for biasing the film units 32 upwardly within container 28 toward a later-to-be-described forwardmost exposure position, such as the illustrated spring platen 34; and an optional flat battery 36 for powering electrical components of camera 12.

Obviously, film pack 10 may be configured without battery 36 when it is to be used in a photographic apparatus that has its own battery power pack or is adapted to be plugged into an electrical outlet.

The film container 28 is preferably of molded plastic construction having relatively thin and substantially planar walls. Any suitable light opaque plastic material, such as polystyrene, may be used.

The main wall sections of container 28 include a forward wall 38, a generally opposed rear wall 40, and a peripheral section adjoining and maintaining walls 38 and 40 in spaced relation and including a pair of lateral side walls 42, a trailing end wall 44, and a leading end wall 46. In FIG. 3, container 28 is shown with its leading end wall 46 in the open position before the insertion of the contents.

Forward wall 38 preferably includes an integrally molded upstanding, generally rectangular rib 48 that defines a generally square light transmitting section or film exposure aperture 50. At one trailing end corner of aperture 50 a pick or film access slot 52 is provided on forward wall 38 and part way down trailing end wall 44 for a film advancing pick mechanism mounted in camera 12. The underside surface 54 of wall 38 serves as a reference bearing surface against which a forwardmost film unit 32 in the stack engages in bearing relation to locate it in the forwardmost exposure position. A leading end portion of wall 38 disposed between aperture 50 and leading end wall 46 carries the numerical designation 56 and includes on the underside leading end portion of bearing surface 54 a pair of laterally spaced, triangular thinned-down sections 58 which define part of the later-to-be-described fluid spread control structure.

Optionally provided are a pair of recesses or cutouts 60 at the leading end of forward wall section 56 and a pair of recesses or indentations 62 at trailing end wall 44 for facilitating the transport, loading, and handling of film container 28 by automatic machines during the assembly and packaging of the improved pack 10.

The rear wall 40 optionally includes a pair of laterally-spaced, diamond-shaped apertures 64 therein, adjacent trailing end wall 44, for providing access by camera mounted battery contacts to the positive and negative terminals (not shown) on the underside of flat battery 36. It will be noted that rear wall 40 is not parallel to forward wall 38 but rather slopes downwardly from trailing end wall 44 towards leading end wall 46. This gives film container 28 a somewhat wedge-shaped profile. As will become obvious later, extra room is needed at the leading end of container 28 to accommodate the relatively thick leading ends of the film units 32 having a rupturable pod of processing fluid thereat.

Container 28 is preferably molded as a single piece structure (shown in FIG. 3) with the leading edges of walls 38, 40 and 42 defining a rectangular leading end opening 66 through which the contents are inserted into container 28. The leading end wall 46 projects forwardly from the leading edge of bottom wall 40 and is pivotally secured thereto by integrally formed hinge connectors 68 bridging the gap between a bottom or lower edge portion of wall 46 and the leading edge of rear wall 40.

The leading end wall 46 is shorter than side walls 42 and terminates, at its upper end, in a top, generally horizontal, edge 70 having an integrally molded upstanding film hold back finger 72 formed near the lateral side of container 28 having the pick opening 52 therein.

An interior surface 74 of leading end wall 46 preferably includes an integrally molded recess or step 76 at its upper end for receiving and supporting the bottom portion of the resiliently displaceable light sealing sheet 26. This portion of sheet 26 is secured to step 76 by any suitable means such as adhesive or ultrasonic bonding.

Integrally molded on the interior side of wall 46, near its lateral margins, is a pair of vertically disposed channels or slots 78 for receiving the lower leading edge portions or ribs 80 of side walls 42 when leading end wall 46 is pivoted upwardly to its closed position after the contents have been inserted into container 28. Leading end wall 46 is secured in the closed position by effecting a bond between the engaged portions of walls 46, 42 and 40. A preferred method for achieving this bond is by the application of ultrasonic energy to establish a thermoplastic weld.

When leading end wall 46 is located in its closed operative position, its top edge 70 cooperates with the upper portions of side walls 42 and their leading edge of forward wall portion 56 to define an elongated laterally extending film withdrawal slot 82 (see FIGS. 1, 4 and 6) through which the forwardmost film unit 32 in the stack is advanced, subsequent to exposure, for transport between pressure-applying members in camera 12 to effect fluid distribution. It will be noted that the hold back finger 72 projects part way across withdrawal slot 82 and serves to prevent more than one film unit 32 being advanced through slot 82 at one time. Also the upper end of light seal 26 extends upwardly in blocking relation to exit slot 82 and may be displaced from this blocking position by the leading end of a film unit 32 (or dark slide 30) being advanced through slot 82. Advantageously, when light seal 26 is displaced by the advancing film unit or dark slide, it bends forwardly over the top edge 70 of leading end wall 46 and provides a smooth sliding surface for the underside of a film unit thus protecting the underside from any roughness associated with the top edge 70 of wall 46 that may be the result of plastic flashing during the molding operation. The horizontal exterior ribs 84 on wall 46 are provided for structural stiffening and are optional.

The contents of film container 28 are loaded thereinto in the order shown in FIG. 3.

Battery 36 is positioned over the interior surface of rear wall 40 with its positive and negative terminals (not shown) on the underside thereof in registered alignment with access openings 64. For a representative example of a flat battery 36 that may be used in pack 10, reference may be had to commonly assigned U.S. Pat. No. 3,877,045.

Positioned over battery 36 is the spring platen 34 which is preferably formed or stamped from a single sheet of metal such as spring steel or aluminum. As shown in FIG. 3, the preferred platen includes a rectangular frame portion 86 for supporting the periphery of film units 32 and an integrally formed H-shaped cross bar and spring leg section 88. Later in the disclosure, reference will be made to the fact that the leading end wall 46 is intentionally sloped or angled with respect to the other walls of container 28 to facilitate the operation of spring platen 34 and minimize the possibility of a film unit 32 not being raised to the forwardmost position in container 28.

The film units 32 are preferably of the integral type that is manufactured in a multilayered laminate form and does away with the need to separate individual positive and negative elements after processing.

The illustrated film units 32 are generally rectangular in shape and have a substantially square image-forming area 90 bordered by a binding mask assembly 92 providing opaque margin areas. At the leading end of the binding assembly 92 is a rupturable pod or container 94 holding a supply of fluid processing composition at the leading end of image area 90 and, disposed at the trailing end of area 90 is a fluid reservoir or trap 96 for collecting and retaining excess processing fluid following the distribution of the fluid between predetermined layers of film unit 32.

In FIG. 4, film unit 32 is diagrammatically represented as a two-sheet element or layer having a top sheet of layer 98 and a facing bottom layer 100.

The pod 94 is arranged at the leading end of layers 98 and 100 and is filled with a fluid processing composition 102 which is discharged and distributed between layers 98 and 100 when the film unit 32 is advanced between a pair of pressure-applying rollers in camera 12. The layers 98 and 100 are shown merely to indicate that the fluid 102 is to be distributed between a predetermined pair of layers of film unit 32. In reality layer 98 is in itself a transparent multilayer laminate including one or more image-receiving layers and layer 100 is also a multilayer element including one or more photosensitive layers. In the illustrated configuration, film unit 32 is adapted to be exposed through the transparent layer or sheet 98 which later serves as a viewing window for viewing the positive print. Because film unit 32 is of the type that is exposed and viewed from the same side, the exposing optics must include an appropriate number of image reversals to accommodate this type of film structure. Alternatively, pack 10 may be configured to include a film unit 32 that is exposed from the bottom side and later viewed from the top side. In this instance, such image reversal optics may not be required.

For a representative example of a film unit suitable for use in pack 10 or 14, see commonly assigned U.S. Pat. No. 3,615,644.

A more detailed discussion of how the fluid 102 is distributed between sheets 98 and 100 in a controlled manner will be provided later.

Initially positioned over the forwardmost film unit 32 in container 28 is the dark slide assembly 30 comprising a relatively stiff, light opaque card or sheet 103, a forward or leading end flexible light shield sheet 103a and a trailing end flexible light opaque sheet 103b secured to a trailing end corner tab of sheet 103. Sheet 103 provides the initial light seal over exposure aperture 50 while the forward light seal 103a is bent down over the leading edge of sheet 103 and sits behind the light seal 26 on leading end wall 46 to provide a secondary or back up light seal for the film withdrawal slot 82. The trailing end light seal 103b initially blocks the pick access slot 52. The forward light seal 103a serves to prevent fogging of the film units 32 by light penetrating film exit slot 82 in the event that the primary light seal 26 is accidentally deflected during handling or that the leading end portion 56 of forward wall 38 is deflected or bowed upwardly as a result of the user squeezing the leading end of the container or applying too much compressive force to the leading ends of the side walls 42 while handling pack 10 for insertion into camera 12.

With reference to FIG. 4, the self-developing camera 12 includes a main housing section 104 and a combination pack loading door and pressure roller housing section 106 pivotally coupled to the main housing section 104 at a pair of pivot pins 108 (only one shown) that pass through the lower rearward ends of a pair of arms 110 on a roller mounting bracket 112 also having the exterior casing portion of housing section 106 secured thereto.

Housing section 106 is shown in its closed operative position in FIG. 4 and is moved to its open or inoperative position by unlatching housing section 106 from housing section 104 (by means of a latch member not shown) in pivoting housing section 106 downwardly, so that bracket 112 pivots in a clockwise direction about pins 108, thereby providing access to an open leading end of a film pack receiving chamber 114 in the lower portion of the main housing section 104. Above chamber 114 is an exposure chamber 116 defined in part by an inclined wall 118 of an open bottom internal light shielding cone assembly.

Briefly, in operation, image-forming light passes through an objective lens assembly 120 and a shutter and aperture assembly 122 on the front of housing section 104 and crosses the upper portion of exposure chamber 116 where it impinges upon a facing inclined mirror 124 mounted on inclined wall 118. The image-forming light is reflected downwardly by mirror 124 and is transmitted through the exposure aperture 50 of container 28 where it is focused on the forwardmost film unit 32 therein being located at the camera's focal plane by means of a later-to-be-described film container receiving and support structure within chamber 114. Following exposure, a pick mechanism (not shown) advances through container slot 52, engages the trailing end of the forwardmost film unit 32 and advances it forwardly through the film withdrawal slot 82 into the bite of a pair of juxtaposed cylindrical pressure-applying rollers 126 and 128 mounted on bracket 112 with the bite line in operative alignment with the film withdrawal slot 82.

The pick mechanism and rollers are driven by an electrical motor coupled thereto by a suitable gear train (neither of which is shown). At least one of the rollers 126 and 128 is rotatably driven in a direction to cause the forwardmost film unit to be advanced therebetween and along a film exit path of travel leading out of camera 12 through an elongated film exit slot 130 in the front of housing section 106. Shown in the drawing is a roller-type shade 132 over exit slot 130 which unfurls when engaged by the advancing film unit 32 and serves as a protective light shield over image area 90 to prevent actinic light on the exterior of the camera from being "piped" back along the transparent layer 98 whereupon it might impinge upon a photosensitive portion of the film unit 32 that has not yet been covered by the processing fluid 102.

The image-forming area 90 of the forwardmost film unit 32 in container 28 is accurately located in registration with the camera's focal plane by film container receiving and supporting structure within chamber 14 that maintains container 28 at an operative position relative to the camera's optical system. This same structure also locates container 28 and particularly the film withdrawal slot 82 in predetermined orientation with respect to the pressure-applying rollers 126 and 128.

It will be noted that the exposure cone within camera housing 104 has a bottom opening that is surrounded by a peripheral flange 134 up against which sections of forward wall 38, surrounding exposure aperture 50, bear to position container 28 relative to lens 120 and mirror 124. Additional support for the leading end 56 of wall 38 is provided by a transverse plate 136 behind the rollers. Plate 136 serves as a rigid back up for the relatively thin wall section 56 and supports the later-to-be-described spread control surfaces on underside 54 in predetermined relation to the bite line of the pressure-applying rollers 126 and 128. The respective portions of forward wall 38 are urged into bearing relation with flange 134 and support plate 136 by means of a pair of laterally spaced support rails 138 at the bottom of chamber 114 and a pair of inclined or ramp-like spring contacts 140 that also extend through container rear wall opening 64 and make electrical contact to the terminals of battery 36. Thus container 28 is supported at its leading end by rails 138 and the trailing end receives its upward urging or support by the spring contacts 140. In this manner, the container 28 is located vertically, within chamber 114, with respect to the camera optics and the pressure-applying rollers 126 and 128.

Longitudinal placement of container 28 within chamber 114 is primarily provided by a vertically disposed rear or trailing end stop plate 142 against which the exterior surface of container trailing end wall 44 is located in bearing relation to accurately place the exposure aperture 50 in the camera's imaging zone and also locate the leading end wall 46 of the container at a predetermined spacing from a transverse portion of roller mounting bracket 112 on camera housing 106 to permit section 106 to be closed without jamming the leading end of container 28.

In order to establish the longitudinal placement or, in other terms, to establish the longitudinal operative position of pack 10 in chamber 114, the camera 12 is provided with a leading end stop 144 that has an interior surface which faces leading end wall 46 and is spaced longitudinally from the interior surface of trailing end stop 144 by a measurement designated P.

It will be noted that in the illustrated embodiment leading end stop 144 comprises a sheet metal tab turned inwardly from a side wall of roller bracket 112 so as to be located in front of a lower portion of container leading end wall 46 adjacent its juncture with rear wall 40.

Figure 5:
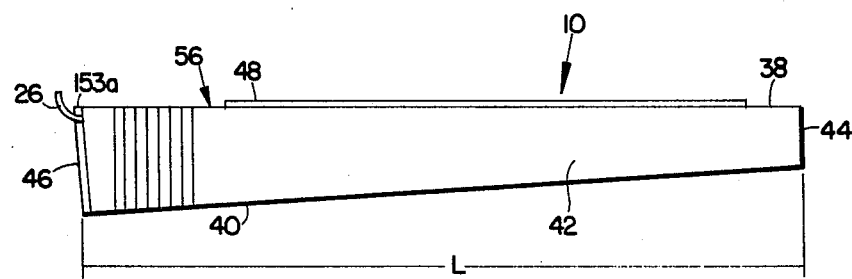
FIG. 5 is a side elevational view of the improved pack of FIG. 1.

As best shown in FIGS. 2, 5 and 9, the illustrated prior art film pack 16 and the improved packs 10 and 14 embodying the present invention have a common longitudinal dimension designated L that is measured between the exterior surfaces of the lower portions of the leading and trailing end walls 46 and 44 respectively adjacent their point of intersection with the rear wall 40.

The spacing P between end stops 42 and 44 is dimensioned to closely approximate L or be just slightly longer than L so that these packs will fit between stops 142 and 144. That is to say, if container 28 is fully inserted into chamber 114 with the exterior surface of trailing end wall 44 in firmly abutting relation to the facing surface of trailing end stop 142, then the loading door section 106 may be pivoted upwardly to its closed position and the leading end stop 144 will clear the lower portion of leading end wall 46. Leading end stop 144 is not intended to engage the leading end wall lower portion with any appreciable force to hold the trailing end wall 44 against trailing end stop 142, but rather it is intended to define the leading end limit of the placement of container 28 in chamber 114. Should the container 28 not be at the fully inserted position but rather occupy a position further to the right than that shown in FIG. 4, the leading end stop 144 will engage the underside leading end of container rear wall 40 when section 106 is pivoted upwardly thereby preventing section 106 from being located in its fully closed position. This provides an indication to the user that he must reopen section 106 and firmly push the container 28 rearwardly further into chamber 114 to its fully inserted position.

Therefore it becomes obvious that if the improved packs 10 and 14 are to be used with existing cameras already on the market, then its lower longitudinal dimension L may not exceed the camera dimension P. Otherwise, the loading door section 106 with the rollers 126 and 128 will not be able to be closed. As will become apparent below, the improved film packs 10 and 14 maintain the lower longitudinal dimension L to achieve compatibility with existing cameras but will be shown to have a longer longitudinal dimension as measured along the forward wall 38 than the prior art film pack 16 and also will include a forward wall 46 which slopes in a direction toward the rollers above the lower portion of wall 46 to facilitate the feeding of the film units 32 toward the forwardmost position by the spring platen 34.

As best shown in FIG. 4, the distance from the lower portion of wall 46 (defined by the leading end limit of P) to the bite line of the rollers 126 and 128, illustrated in the drawing as a line connecting the center of the two rollers, is designated as a longitudinally extending zone Z through which the forwardmost film unit 32 must be advanced by the camera pick mechanism to introduce the forwardmost film unit 32 into the bite of rollers 126 and 128.

For consistency in the following discussion, the container engaging interior surface of trailing end stop 142 will be defined as lying in an imaginary plane that is substantially normal to the camera's focal plane. The distance P from the interior surface of stop 142 will be measured to an imaginary plane that contains the surface of leading end stop 144 that confronts the lower portion of leading end wall 46 and lies in an imaginary plane that is also substantially normal to the camera's focal plane. The distance from trailing end stop interior surface to the bite line of rollers 126 and 128 will then equal the distance P+Z.

From FIG. 4 it will be seen that the forwardmost film unit 32 advances along a substantially straight line path through withdrawal slot 82 and into the bite of rollers 126 and 128. However, on the exit side of the rollers, the emerging film unit is deflected downwardly from its normal path of travel by a downwardly inclined film deflection ramp surface 146 that defines the upper boundary of the camera film exit opening 130. Because the film unit 32 is fabricated to include certain plastic sheet materials, such as Mylar, and has a certain degree of inherent stiffness, ramp 146 induces a gentle large radius bend in the film unit, on the exit side of the rollers, which contribute to the efficiency with which the fluid 102 is distributed between layers 98 and 100. While the bending effect is not precisely understood at this time, one may speculate that a shear force induced at the interface of layers 98 and 100 stabilizes the spacing between these layers in the face of the fluid 102 being extruded toward the exit side by rollers 126 and 128.

This concludes the general description of the camera 12 and the film packs 10, 14 and 16 configured for use therein and now, at last, we may move on to discuss distribution of the processing fluid 102 between the predetermined layers 98 and 100 of the film unit 32 and the specific spread control structure that forms a part of these film packs.

As noted earlier, the underside surface 54 of container forward wall 38, at the leading end portion 56, includes the integrally formed triangular sections 58 to define a spread control surface 148 located adjacent the film withdrawal slot 82.

As best shown in FIG. 7, the triangular sections 58 are tapered so that the leading end of forward wall 38 becomes progressively thinner as it approaches its lateral intersections with the top of the container side walls 42. That portion of control surface 148 between the triangular sections 58 is, therefore, relatively thick and is dimensioned latterally to correspond to a medial longitudinal section of the film unit's image-forming area 90.

When the container 28 is located in chamber 114 the leading end portion 56 of forward wall 38 bears against the in-camera support plate 136 so that the relatively thin walled portion 56 is stabilized in predetermined relation to the bite line of the pressure-applying rollers. Spring platen 34 provides the upward biasing force that urges the forwardmost film unit 32 into positive engagement with the underside surfac 54 of the forward wall 38. From FIG. 6, it will be apparent that in the vicinity of the film exit slot 82, the film unit 32 is urged against spread control surface 148 and the relatively thick center section, in combination with the biasing force provided by platen 34, will apply a compressive pressure to a selective medial portion of the image-forming area 90 as film unit 32 is advanced through slot 82. Where the triangular sections 58 thin out, of course, the compressive pressure is much less. Thus the pressure at the lateral margins may be considered small compared to the magnitude of the compressive force applied to the center section.

Figure 10:
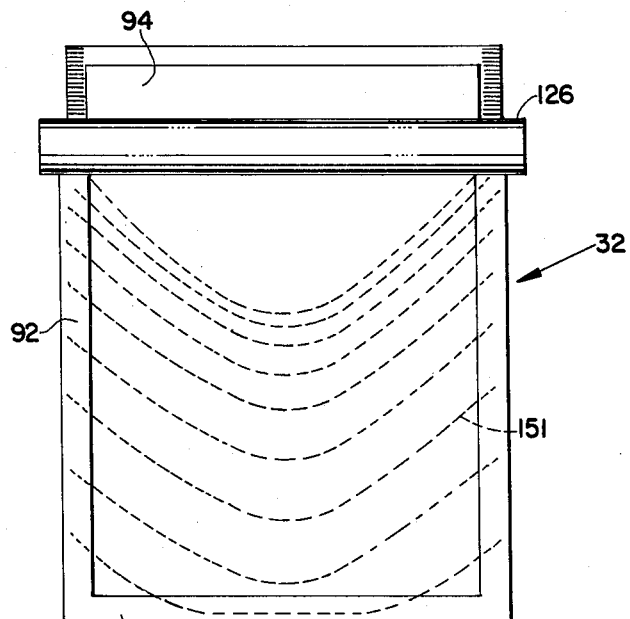
FIG. 10 is a diagrammatic plan view of a film unit, being advanced between a pair of pressure-applying rollers without the benefit of spread control structure on the film container, showing, in dotted lines, the progressive advancement of a tongue-shaped fluid wave front toward the trap.
Figure 11:
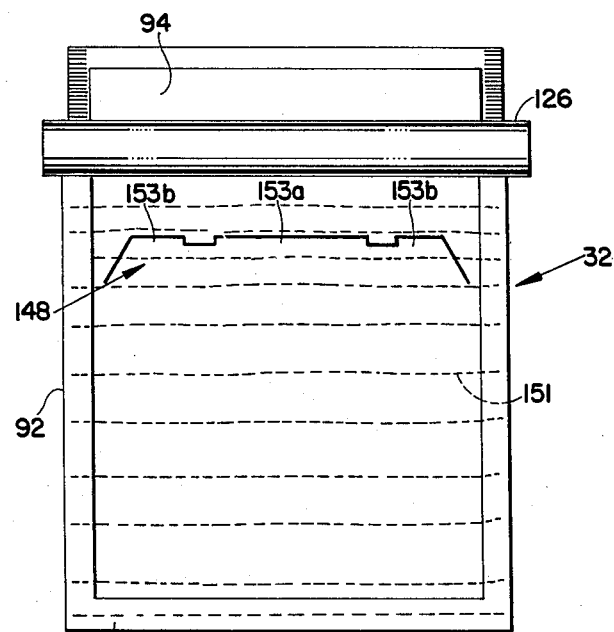
FIG. 11 is a diagrammatic plan view of such a film unit showing, in dotted lines, how the shape of the fluid wave front is modified by a spread control surface on the film container.

The spread control function of surface 148 acting in cooperation with the spring platen 34 is diagrammatically illustrated in FIGS. 10 and 11 of the drawings.

The film unit 32, as noted earlier, may be thought of as a two-layer laminate having opposed layers or sheet elements 98 and 100 that are bound together at their lateral margins by the binding mask 92.

After exposure, the film unit 32 is advanced between the rollers 126 and 128 leading end first. The rollers apply a first compressive pressure to the leading end pod 94 which causes its relatively weak trailing end seal to burst thereby discharging the fluid 102 rearwardly toward the trap 96 at the trailing end of film unit 32. Although the film unit 32 may be initially provided with a wax-like binder between layers 98 and 100, the fluid 102 exerts sufficient hydrostatic pressure to cause delamination so that the fluid may be distributed therebetween. Because layers 98 and 100 are bound at the lateral margins, it will be apparent to those skilled in the art that these layers 98 and 100 may be more readily forced apart in the center section of the film unit than out at the lateral margins. In other words, a transverse cross-section of the film unit upon initial discharge of the fluid 102 may look more elliptical or bowed than having the layers 98 and 100 disposed in substantially parallel spaced relation. With a larger gap in the center section, it becomes obvious that there is higher resistance to fluid flow towards the trap end at the lateral margins than in the center section of the image-forming area 90.

As shown in FIG. 10, the fluid 102, without the benefit of a second compressive pressure applied selectively to the medial portion of image-forming area behind rollers 126 and 128, will be distributed progressively toward the trap end and exhibit a tongue-shaped wave front diagrammatically illustrated by the convex dotted lines 151.

In the interests of keeping the physical dimensions of the film unit 32 as small as possible and to reduce materials cost it is highly desirable to provide the minimum amount of processing fluid 102 consistent with completely covering the image-forming area 90 with a substantially uniform coating of fluid 102.

From FIG. 10 it will be seen that if the fluid 102 is allowed to be distributed with this tongue-shaped wave front, that the wave front will reach the trap end in the center first creating the possibility that there may not be sufficient fluid to completely cover the trailing end lateral corners of the image-forming area 90.

In the prior art pack 16, illustrated in FIG. 2, and in the improved film packs 10 and 14, the spread control surface 148 of pack 10 (and similar functioning surfaces in the prior art pack 16 and the alternative embodiment pack 14) in cooperation with the spring platen 34 serve to apply a second compressive pressure to the film unit behind the rollers and to limit that second compressive pressure to a medial longitudinal section of the image-forming area so as to somewhat restrict the gap between the layers 98 and 100 in the center, while at the same time providing relief out at the lateral margins, to modify the shape of the wave front 151 so that it is more uniform from side to side than the representative tongue-shaped wave front of FIG. 10.

In effect, the application of the second compressive pressure to a selected center portion of the film unit's image-forming area 90 retards the wave front in the center and diverts the fluid flow towards the pressure-relieved lateral margin areas.

It should be pointed out at this point that the interaction of film unit 32 with the spread control structure of pack 10 and the camera processing structure including rollers 126 and 128 along with the film deflecting ramp surface 146 constitutes a highly complex interface with many factors contributing their respective influence to the distribution of the processing composition 102.

Certainly, the specific structural elements, various materials and the way in which they are combined in a given type of self-developing film unit 32 will influence the spreading characteristics. For example, the surface tension characteristics of the interface between layers 98 and 100, the viscosity of the fluid 102, the rigidity or flexibility of the surface sheets, and the specific design of the pod seals and trap structure are all variables which may significantly influence the spreading characteristics.

Within the film container 28, the nature and characteristic features of the spread control surface 148 along with the specific compressive force applied by spring platen 34 are design variables which will influence the efficiency with which fluid 102 is distributed.

The rollers 126 and 128 are critical elements in determining the efficiency of the spread and such variables as roller diameter, roller surface friction, the amount of compressive pressure applied by the top and bottom rollers acting in combination, and the velocity at which the film unit is advanced therebetween are just some of the factors that will influence fluid distribution.

On the exit side of the rollers, the angle and spacing of the deflecting ramp surface 146 will determine the radius of bend somewhat, depending on the relative stiffness of the sheet materials used in the film unit 32.

What is important to note is that all of these various structural elements and characteristics of individual materials used will have some influence on the spreading characteristics and camera and pack systems that exhibit highly efficient spreading have been arrived at by carefully fine tuning each of these variables.

In the present disclosure, we are maintaining all of the spread system structure and film unit characteristics as constants except for the modification of the spread control surface 148 which constitutes a major portion of the subject matter of the present invention.

In order to clearly show the significant structural differences (other than the removal of the end cap) between the first embodiment of the improved film pack 10 and the prior art film pack 16, a dotted reference line 152 has been provided in FIG. 3 of the drawings to represent the leading edge configuration of the forward and side walls of the prior art pack 16. Also, V-shaped marks 154 adjacent the trailing end of the triangular sections 58 are shown to indicate the trailing end position of these triangular sections on the prior art cassette 16.

Broadly speaking, it will be seen that the leading ends of forward wall 38 and side walls 42 have been lengthened while the longitudinal length of the rear wall 40 and the comparable thickness of the lower end of leading end wall 46 remain essentially the same to maintain a common dimension L.

In other words, all of the structure on the forward wall 38 and side walls 42 that is located to the left of the reference line 152 is additional structure that is indicative of the improvement in the present invention. From the placement of the marks 154 it will be noted that the triangular sections 58 have essentially the same dimensions as those used on the prior art pack 16 but they have been moved forward so that they still terminate at the leading edge of the forward wall 38.

In the first embodiment shown in FIG. 3, the total spread control surface 148 on the underside of leading end portion 56 includes a first spread control surface section 153a centrally located on the leading end portion 56 of container forward wall 38 between the optional leading end cut outs 60 and a pair of laterally spaced second spread control surface sections 153b located between their respective side walls 42 and the cut outs 60. Depending from sections 153b are the tapered side wall extensions 156 which are tapered or sloped to become progressively longer from bottom wall 40 to the point where they meet sections 153b.

In the illustrated embodiment, the first spread control section 153a extends longitudinally beyond reference line 152 a distance of approximately 0.060 inches where it terminates in a leading edge portion 158 of the forward wall 38. The second spread control surfaces 153b extend beyond reference line 152 a distance approximately 0.030 inches where they terminate in leading edge portions 160. It will be noted that the tapered side wall sections 156 are flush at their top leading edges with leading edge portions 160.

When the leading end wall 46 is raised to its closed position, at least the center spread control section 158 extends outwardly over or above the top edge 70 of wall 46. It has been found that utilizing this structure substantially alleviates the potential problem of premature rupture of the film unit pods 94 by the user applying excessive downward pressure to the leading end portion 56 of forward wall 38 as he handles the pack 10 to load it into the receiving chamber of camera 12. In other words, the interference of section 158 with the top edge 70 of wall 46 acts as a stop to limit the downward deflection of forward wall section 56 thereby substantially reducing the possibility of inadvertent rupture of a film pod 94.

While the addition of the spread control surface sections 153a and 153b seem to be of minimal consequence structurally, it has been found that the addition of this structure, in combination with the moving of the spread control triangles 58 further toward the leading end by approximately 0.030 inches, makes a significant improvement in the controlling and efficiency with which the fluid 102 is distributed between layers 98 and 100 of the film unit 32.

As noted earlier in this disclosure, the prior art pack 16 includes a forward wall having a similar spread control surface (that portion behind the reference line 152) for applying a second compressive pressure to a selected portion of the image forming area 90 of film unit 32 to retard the center of the wave front 151 and modify the shape of the wave front to more nearly approach a equal lateral distribution of fluid across the film unit 32.

That spread control structure on the prior art pack 16 works very well in that the fluid 102 is spread in a manner where there are, on a statistical basis, very few instances in which the trailing end corners of the image forming area 90 are not completely covered.

However, it should be noted that the fluid 102 is also distributed under the lateral margins of the mask to some extent and also into the trap area at the trailing end of image forming area 90.

While the entire image area 90 may have been covered to provide a visually and esthetically pleasing picture, analysis of processed film units from the prior art pack 16 have shown that the distribution of the fluid 102 under the lateral margins of the mask and in the trap area have been less than uniform from side to side.

With the improvement shown in FIG. 3, analysis has shown that there has been a significant improvement in the uniformity of the fluid distribution in the lateral margin and trap areas indicating that the spread mechanism is more efficient and that statistically there should be fewer instances of incomplete coverage.

In order to insure that there is complete coverage, and reduce the statistical chance of failure, the pod 94 is provided with a volume of fluid 102 that is slightly greater than the amount of fluid needed for full coverage. This excess amount is provided as a design safety factor and is intended to be retained in the trailing end trap area 96.

With the improved structure shown in FIG. 3 providing better spread control and resulting in more efficient utilization of the fluid 102, it may be possible to slightly reduce the amount of fluid 102 packaged with each film unit 32 thereby possibly providing a manufacturing cost reduction that becomes significant when the volume of film units manufactured on an annual basis is considered.

The essence of the improvement in controlling the spread of fluid 102 is to extend the spread control surface 148 beyond the imaginary plane at stop 144 and into the zone Z toward the camera pressure-applying rollers so as to provide the additional controlling of the processing fluid by applying the second compressive pressure to the selected portion of the film unit image area in closer relation to the camera pressure-applying rollers than the imaginary plane while at the same time retaining the longitudinal location of the container in the receiving chamber.

In the first embodiment of the invention, namely pack 10, that structure at the leading end of container 28 projecting in the direction of film advancement beyond the reference line 152 extends into zone Z when pack 10 is located at its operative position in chamber 114.

It will be noted that the lateral sections 153b are set back from the center section 153a by approximately 0.030 inches. This configuration is provided not so much for its effect on spread control, but rather to make pack 10 compatible with existing automatic machinery for loading the contents into container 28 and subsequently closing and securing leading end wall 46.

Pack 14, an alternative embodiment of the present invention, is best shown in FIGS. 8 and 9 of the drawings. Similar structure on pack 14 carries the same numerical designations as those used for pack 10.

In this embodiment, the spread control surface 148 has been further extended longitudinally over the leading end wall 46.

For convenience, a dotted reference line 162 has been provided on the leading end portion 56 of forward wall 38 to show the leading edge boundary of pack 10. Thus all structure shown in FIG. 8 that is beyond (to the left of) line 162 has been added to the spread control configuration of pack 10 to arrive at the illustrated forward wall structure of pack 14.

This pack has been designed to be manufactured on different automatic contents loading machinery and does not require the forward cut outs 60. It will be noted that the additional structure, designated 163, terminates in a straight leading edge 164. Also, side wall extensions 166 are provided beyond the structure of pack 10. The center section 163 is approximately 0.030 inches longer than the previously noted center section 153a of pack 10. To the lateral sides of the center section the forward wall 38 is extended approximately 0.060 inches beyond the corresponding lateral sections 153b of pack 10. The triangular sections 58 have not been moved forwardly relative to the exposure aperture 50 but have been extended over the leading end wall 46 to terminate at the leading edge 164 of extension 163.

Analysis of film units 32 that have been processed with the spread control structure of pack 14 indicate additional improvement in the efficiency and control of distributing the fluid 102 between layers 98 and 100.

From the experimental results using the improved packs 10 and 14 one may conclude that spread control and efficiency may be improved by moving the leading edge of the spread control surface 148 closer to the bite line of rollers 126 and 128. At the present time there are practical considerations relating to stack up tolerances and manufacturing capabilities that limit just how close the spread control surface may be located in relation to the bite line. In any event, what we have learned and attempt to teach here is simply that significant improvement in controlling the distribution of fluid 102 may be achieved by extending the spread control surface 148 into zone Z as far as possible toward the bite line of the rollers but in a manner that is consistent with practical manufacturing considerations.

It should be really apparent to those having ordinary skill in the art that the principals of improving spread control disclosed herein may be applied to cameras other than the illustrated camera 12 which may be characterized as a front loading apparatus having a movable leading end stop 144. That is, one may use packs 10 or 14 in a rear loading camera where the leading end stop 144 is fixed and serves as the longitudinal placement reference surface rather than the rear stop 142.

Further, it can be readily appreciated that this invention may be embodied or practiced in still other ways without departing from the scope or essential character thereof. Therefore, the embodiments described herein are illustrative and not restrictive, the scope of the invention being indicated by the following claims, and all inventions which come within the meaning of these claims are intended to be embraced therein.

What is claimed is:

1. An improved photographic film pack for use in a self-developing camera, said pack including a container having a pair of generally opposed, substantially planar walls joined by a peripheral section including opposed leading and trailing end walls, one of said planar walls having a film exposure aperture therein and providing a forward wall of said container as viewed with respect to scene exposure, said opposed planar wall providing a rear wall of said container, at least one film unit locatable in a forwardmost position within said container with its image forming area adjacent to and in substantial registration with said exposure aperture, said leading end wall having a film exit slot therein adjacent said forward wall and through which the forwardmost film unit is advanced from said container into operative relation with camera pressure applying means for distributing a processing fluid within the film unit as the film unit is advanced from the container, said pack further having spread control means including at least one spread control surface located on the interior side of a leading end of said forward wall of said container adjacent said film exit slot for additionally controlling fluid distribution by applying pressure to a selected portion of the film unit's image area, said container having a predetermined longitudinal dimension L, as measured between the lower exterior surfaces of said leading and trailing end walls adjacent said rear wall, the camera also including means for receiving and supporting said film pack therein with said film exit slot in operative facing relation to said camera pressure applying means so that said forwardmost film unit may be advanced through said exit slot to said pressure applying means, said pack receiving and supporting means including at least a trailing end stop longitudinally spaced rearwardly from said camera pressure applying means by a distance greater than L and against which said trailing end wall of said container abuts for locating the container longitudinally at an operative position in said camera, when so located said lower exterior portion of said leading end wall of said container lying in an imaginary plane substantially normal to a camera focal plane and being located at a distance approximating L from said trailing end stop, the improvement wherein at least a portion of said spread control surface on said leading end of said container forward wall extends beyond said lower exterior surface of said leading end wall of said container such that this portion of said spread control surface extends in said camera beyond said imaginary plane toward said camera pressure applying means so as to provide said additional controlling of said processing fluid by applying the compressive pressure to the selected portion of said film unit image area in closer relation to said camera pressure applying means than said imaginary plane while retaining said longitudinal location of said container in said camera and wherein said camera pressure applying means and said spread control means are positioned relative to each other and suitably configured so as to modify the distribution of the processing fluid to be a substantially uniform wave front and thereby significantly improve the efficiency of fluid distribution to enable the use of a minimum volume of processing fluid.

2. An improved photographic film pack for use in a self-developing camera, said pack including a container having a pair of generally opposed, substantially planar walls joined by a peripheral section including opposed leading and trailing end walls, one of said planar walls having a film exposure aperture therein and providing a forward wall of said container as viewed with respect to scene exposure; said opposed planar wall providing a rear wall of said container, at least one film unit locatable in a forwardmost position within said container with its image forming area adjacent to and in substantial registration with said exposure aperture, said leading end wall having a film exit slot therein adjacent said forward wall and through which the forwardmost film unit is advanced from said container into operative relation with camera pressure applying means for distributing a processing fluid within the film unit as the film unit is advanced from the container, said pack further having spread control means including at least one spread control surface located on the interior side of a leading end of said forward wall of said container adjacent said film exit slot for additionally controlling fluid distribution by applying pressure to a selected portion of the film unit's image area, said container having a predetermined longitudinal dimension L, as measured between the lower exterior surfaces of said leading and trailing end walls adjacent said rear wall, the camera also including means for receiving and supporting said film pack therein with said film exit slot in operative facing relation to said camera pressure applying means so that said forwardmost film unit may be advanced through said exit slot to said pressure applying means, said pack receiving and supporting means including longitudinally spaced leading and trailing end stops defining the longitudinal placement of said container within said camera, said leading end stop being closest to said camera pressure applying means and lying in an imaginary plane substantially normal to a camera focal plane at a given distance from said camera pressure applying means, the improvement wherein at least a portion of said spread control surface on said leading end of said container forward wall extends beyond said lower exterior surface of said leading end wall of said container such that this portion of said spread control surface extends in said camera beyond said imaginary plane toward said camera pressure applying means so as to provide said additional controlling of said processing fluid by applying the compressive pressure to the selected portion of said film unit image area in closer relation to said camera pressure applying means than said imaginary plane while retaining said longitudinal placement of said container in said camera and wherein said camera pressure applying means and said spread control means are positioned relative to each other and suitably configured so as to modify the distribution of the processing fluid to be a substantially uniform wave front and thereby significantly improve the efficiency of fluid distribution to enable the use of a minimum volume of processing fluid.

3. An improved photographic film pack for use in a self-developing camera, the pack being of the type including a film container having a film exposure aperture in a forward wall thereof and film withdrawal slot in a leading end wall thereof adjacent a leading end portion of said forward wall, at least one multilayer self-developing film unit having an image forming area thereon locatable in a forwardmost position within the container with its image forming area in registration with the exposure aperture for exposure and also in position for subsequent advancement through the withdrawal slot into operative relation with external camera mounted pressure applying means for effecting the distribution of a fluid processing composition between predetermined layers of the film unit, the pack having spread control means including at least one spread control surface located on the interior of the forward wall at the leading end portion thereof for additionally facilitating the distribution of the fluid between the film unit layers by progressively applying a second compressive pressure to a selected portion of the film unit image forming area as the film unit is advanced through the withdrawal slot, the container further including a rear wall disposed opposite the forward wall and spaced therefrom by a container peripheral section including a pair of side walls, a trailing end wall and the leading end wall, the container further being configured to have a predetermined longitudinal dimension L as measured along the rear wall between lower exterior portions of the leading and trailing end walls where each adjoin the rear wall, the self-developing camera including a housing having a receiving chamber, means for locating and supporting the film container at an operative position within the chamber so that the forwardmost film unit in the container is located at the camera's focal plane for exposure, and pressure applying means mounted in the housing in spaced operative alignment to the film withdrawal slot of a film container located at its operative position within the chamber, the locating and supporting means including opposed leading and trailing stops spaced apart by a distance P, at least as great as the length L of the container, for defining the longitudinal placement of the container within the chamber, the end stops being located with respect to the pressure applying means so as to define a film transport zone Z between the camera pressure applying means and an imaginary plane normal to the focal plane and passing through the leading end stop, the improvement wherein at least a portion of the spread control surface located on the forward wall of the container extends into the zone Z toward the pressure applying means so as to maintain the application of the second compressive pressure to the image area of the film unit within a portion of the zone Z and wherein said camera pressure applying means and said spread control means are positioned relative to each other and suitably configured so as to modify the distribution of the processing fluid to be a substantially uniform wave front and thereby significantly improve the efficiency of the fluid distribution to enable the use of a minimum volume of processing fluid.

4. An improved photographic film pack for use in a self-developing camera, the pack being of the type including a film container having a film exposure aperture in a forward wall thereof and film withdrawal slot in a leading end wall thereof adjacent a leading end portion of said forward wall, at least one multilayer self-developing film unit having an image forming area thereon locatable in a forwardmost position within the container with its image forming area in registration with the exposure aperture for exposure and also in position for subsequent advancement through the withdrawal slot into operative relation with external camera mounted pressure applying means for effecting the distribution of a fluid processing composition between predetermined layers of the film unit, the pack having spread control means including at least one spread control surface located on the interior of the forward wall at the leading end portion thereof for additionally facilitating the distribution of the fluid between the film unit layers by progressively applying a second compressive pressure to a selected portion of the film unit image forming area as the film unit is advanced through the withdrawal slot, the container further including a rear wall disposed opposite the forward wall and spaced therefrom by a container peripheral section including a pair of side walls, a trailing end wall and the leading end wall, the container further being configured to have a predetermined longitudinal dimension L as measured along the rear wall between lower exterior portions of the leading and trailing end walls where each adjoin the rear wall, the self-developing camera including a housing having a receiving chamber, means for locating and supporting the film container at an operative position within the chamber so that the forwardmost film unit in the container is located at the camera's focal plane for exposure, and pressure applying means mounted in the housing in spaced operative alignmet to the film withdrawal slot of a film container located at its operative position within the chamber, the locating and supporting means including opposed leading and trailing stops spaced apart by a distance P, at least as great as the length L of the container, for defining the longitudinal placement of the container within the chamber, the end stops being located with respect to the pressure applying means so as to define a film transport zone Z between the camera pressure applying means and an imaginary plane normal to the focal plane and passing through the leading end stop, the improvement wherein at least a portion of the spread control surface located on the forward wall of the container extends into the zone Z toward the pressure applying means so as to maintain the application of the second compressive pressure to the image area of the film unit within a portion of the zone Z thereby increasing the uniformity and efficiency of fluid distribution, and wherein the spread control surface includes a first section having its leading edge disposed in substantially flush relationship with an interior surface of the container's leading end wall, adjacent the film withdrawal slot, and a second control surface section that extends forwardly beyond the first section in the direction of film advancement through the film withdrawal slot so that a leading edge portion of the second section overlies an upper edge of the leading end wall, defining the bottom edge of the withdrawal slot, and is in position to engage this upper edge and limit the downward deflection of the leading end portion of the container forward wall, in the event of an inadvertent application of a downward force on the leading end section during pack handling, to prevent a resultant application of a compressive pressure to a film unit in the container which may lead to the premature discharge of a supply of fluid processing composition integrally packaged with the film unit.

5. The improved photographic film pack of claim 4 wherein the spread control surface extends in the direction of film unit advancement through the withdrawal slot a distance sufficient to locate at least a portion of its leading edge beyond the exterior surface of the upper portion of the leading end wall adjacent the bottom of the withdrawal slot.

6. An improved photographic film pack for use in a self-developing camera, the pack being of the type including a film container having a film exposure aperture in a forward wall thereof and film withdrawal slot in a leading end wall thereof adjacent a leading end portion of said forward wall, at least one multilayer self-developing film unit having an image forming area thereon locatable in a forwardmost position within the container with its image forming area in registration with the exposure aperture for exposure and also in position for subsequent advancement through the withdrawal slot into operative relation with external camera mounted pressure applying means for effecting the distribution of a fluid processing composition between predetermined layers of the film unit, the pack having a spread control means including at least one spread control surface located on the interior of the forward wall at the leading end portion thereof for additionally facilitating the distribution of the fluid between the film unit layers by progressively applying a second compressive pressure to a selected portion of the film unit image forming area as the film unit is advanced through the withdrawal slot, the container further including a rear wall disposed opposite the forward wall and spaced therefrom by a container peripheral section including a pair of side walls, a trailing end wall and the leading end wall, the container further being configured to have a predetermined longitudinal dimension L as measured along the rear wall between lower exterior portions of the leading and trailing end walls where each adjoin the rear wall, the self-developing camera including a housing having a receiving chamber, means for locating and supporting the film container at an operative position within the chamber so that the forwardmost film unit in the container is located at the camera's focal plane for exposure, and pressure applying means mounted in the housing in spaced operative alignment to the film withdrawal slot of a film container located at its operative position within the chamber, the locating and supporting means including opposed leading and trailing stops spaced apart by a distance P, at least as great as the length L of the container, for defining the longitudinal placement of the container within the chamber, the end stops being located with respect to the pressure applying means so as to define a film transport zone Z between the camera pressure applying means and an imaginary plane normal to the focal plane and passing through the leading end stop, the improvement wherein at least a portion of the spread control surface located on the forward wall of the container extends into the zone Z toward the pressure applying means so as to maintain the application of the second compressive pressure to the image area of the film unit within a portion of the zone Z thereby increasing the uniformity and efficiency of fluid distribution and wherein the pack initially includes a plurality of such film units arranged in stacked relationship within the container and the spread control means includes means for applying an upward biasing force to the stack of film units to urge the forwardmost film unit in the stack into bearing relation with the underside of the forward wall and the spread control surface located on the leading end portion thereof and also to bring the forwardmost film unit into alignment with the withdrawal slot, and the leading end wall of the container is sloped forwardly from its lower portion to extend progressively further into the zone Z, when the container is located at its operation position in the camera chamber, for providing a progressively increasing longitudinal interior dimension of the container, as measured between the interior facing surfaces of the leading and trailing end walls, for facilitating the upward movement of the film units by the biasing means and reducing the probability of a film unit becoming wedged between these facing surfaces and thereby failing to become totally positioned at the forwardmost position in the container.

* * * * *